US009104132B2

(12) United States Patent
Iida et al.

(10) Patent No.: US 9,104,132 B2
(45) Date of Patent: Aug. 11, 2015

(54) APPARATUS TO FORM LATENT IMAGE USING DITHER MATRICES HAVING MINUTE AND NORMAL EXPOSURE AREAS CONTROLLING TONER ADHESION

(71) Applicant: CANON KABUSHIKI KAISHA, Tokyo (JP)

(72) Inventors: Kenichi Iida, Tokyo (JP); Yusuke Shimizu, Yokohama (JP); Toshihiko Takayama, Kawasaki (JP); Ryo Morihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/522,375

(22) Filed: Oct. 23, 2014

(65) Prior Publication Data

US 2015/0116732 A1 Apr. 30, 2015

(30) Foreign Application Priority Data

Oct. 31, 2013 (JP) ................................ 2013-227193

(51) Int. Cl.

*H04N 1/405* (2006.01)
*H04N 1/29* (2006.01)
*G06K 15/02* (2006.01)
*G06K 15/14* (2006.01)
*G03G 15/043* (2006.01)

(52) U.S. Cl.

CPC .................................. *G03G 15/043* (2013.01)

(58) Field of Classification Search

None

See application file for complete search history.

(56) References Cited

U.S. PATENT DOCUMENTS

| | | | | |
|---|---|---|---|---|
| 6,271,868 | B1 * | 8/2001 | Kashihara | 347/252 |
| 6,342,953 | B1 * | 1/2002 | Wibbels et al. | 358/1.9 |
| 6,456,394 | B1 * | 9/2002 | Gwaltney et al. | 358/1.9 |
| 2013/0235142 | A1 * | 9/2013 | Katagiri et al. | 347/118 |

FOREIGN PATENT DOCUMENTS

| | | | |
|---|---|---|---|
| JP | 2000-131899 | A | 5/2000 |
| JP | 2002-16814 | A | 1/2002 |
| JP | 2003-287930 | A | 10/2003 |
| JP | 2003-312050 | A | 11/2003 |
| JP | 2006-96008 | A | 4/2006 |
| JP | 2012-058721 | A | 3/2012 |
| JP | 2012-189886 | A | 10/2012 |
| JP | 2013-164511 | A | 8/2013 |

* cited by examiner

*Primary Examiner* — Scott A Rogers
(74) *Attorney, Agent, or Firm* — Canon U.S.A., Inc. IP Division

(57) ABSTRACT

An image forming apparatus includes a signal generating unit that stores information on a plurality of dither matrices preset in correspondence with the density level of toner to be attached to the photosensitive member and converts input image data based on the dither matrices to generate a driving signal. The signal generating unit stores information on a first dither matrix corresponding to a first density level and a second dither matrix corresponding to a second density level higher than the first density level. The first dither matrix includes a minute exposure area in which the exposure device is caused to emit light to attain a potential at which no toner adheres to the photosensitive member, and the second dither matrix includes a normal exposure area in which the exposure device is caused to emit light to attain a potential at which toner adheres to the photosensitive member.

18 Claims, 18 Drawing Sheets

FIG. 4

| | | |
|---|---|---|
| a | b | c |
| d | e | f |
| g | h | i |

FIG. 5A

| | | |
|---|---|---|
| 9 | 5 | 6 |
| 4 | 1 | 2 |
| 8 | 3 | 7 |

FIG. 5B

| | | |
|---|---|---|
| R | L | L |
| R | C | L |
| R | L | L |

FIG. 6

| PIXEL a | |
|---|---|
| LEVEL | THRESHOLD VALUE |
| 1 | 229 |
| 2 | 229 |
| 3 | 229 |
| 4 | 229 |
| 5 | 229 |
| 6 | 230 |
| 7 | 231 |
| 8 | 232 |
| 9 | 233 |
| 10 | 234 |
| 11 | 235 |
| 12 | 236 |
| 13 | 237 |
| 14 | 238 |
| 15 | 239 |
| 16 | 240 |
| 17 | 241 |
| 18 | 242 |
| 19 | 243 |
| 20 | 244 |
| 21 | 245 |
| 22 | 246 |
| 23 | 247 |
| 24 | 248 |
| 25 | 249 |
| 26 | 250 |
| 27 | 251 |
| 28 | 252 |
| 29 | 253 |
| 30 | 254 |
| 31 | 255 |

| PIXEL b | |
|---|---|
| LEVEL | THRESHOLD VALUE |
| 1 | 115 |
| 2 | 115 |
| 3 | 115 |
| 4 | 115 |
| 5 | 115 |
| 6 | 116 |
| 7 | 117 |
| 8 | 118 |
| 9 | 119 |
| 10 | 120 |
| 11 | 121 |
| 12 | 122 |
| 13 | 123 |
| 14 | 124 |
| 15 | 125 |
| 16 | 126 |
| 17 | 127 |
| 18 | 128 |
| 19 | 129 |
| 20 | 130 |
| 21 | 131 |
| 22 | 132 |
| 23 | 133 |
| 24 | 134 |
| 25 | 135 |
| 26 | 136 |
| 27 | 137 |
| 28 | 138 |
| 29 | 139 |
| 30 | 140 |
| 31 | 141 |

| PIXEL c | |
|---|---|
| LEVEL | THRESHOLD VALUE |
| 1 | 135 |
| 2 | 142 |
| 3 | 143 |
| 4 | 144 |
| 5 | 145 |
| 6 | 146 |
| 7 | 147 |
| 8 | 148 |
| 9 | 149 |
| 10 | 150 |
| 11 | 151 |
| 12 | 152 |
| 13 | 153 |
| 14 | 154 |
| 15 | 155 |
| 16 | 156 |
| 17 | 157 |
| 18 | 158 |
| 19 | 159 |
| 20 | 160 |
| 21 | 161 |
| 22 | 162 |
| 23 | 163 |
| 24 | 164 |
| 25 | 165 |
| 26 | 166 |
| 27 | 167 |
| 28 | 168 |
| 29 | 169 |
| 30 | 170 |
| 31 | 171 |

| PIXEL d | |
|---|---|
| LEVEL | THRESHOLD VALUE |
| 1 | 21 |
| 2 | 85 |
| 3 | 86 |
| 4 | 87 |
| 5 | 88 |
| 6 | 89 |
| 7 | 90 |
| 8 | 91 |
| 9 | 92 |
| 10 | 93 |
| 11 | 94 |
| 12 | 95 |
| 13 | 96 |
| 14 | 97 |
| 15 | 98 |
| 16 | 99 |
| 17 | 100 |
| 18 | 101 |
| 19 | 102 |
| 20 | 103 |
| 21 | 104 |
| 22 | 105 |
| 23 | 106 |
| 24 | 107 |
| 25 | 108 |
| 26 | 109 |
| 27 | 110 |
| 28 | 111 |
| 29 | 112 |
| 30 | 113 |
| 31 | 114 |

| PIXEL e | |
|---|---|
| LEVEL | THRESHOLD VALUE |
| 1 | 1 |
| 2 | 1 |
| 3 | 1 |
| 4 | 1 |
| 5 | 1 |
| 6 | 2 |
| 7 | 3 |
| 8 | 4 |
| 9 | 5 |
| 10 | 6 |
| 11 | 7 |
| 12 | 8 |
| 13 | 9 |
| 14 | 10 |
| 15 | 11 |
| 16 | 12 |
| 17 | 13 |
| 18 | 14 |
| 19 | 15 |
| 20 | 16 |
| 21 | 17 |
| 22 | 18 |
| 23 | 19 |
| 24 | 20 |
| 25 | 21 |
| 26 | 22 |
| 27 | 23 |
| 28 | 24 |
| 29 | 25 |
| 30 | 26 |
| 31 | 27 |

| PIXEL f | |
|---|---|
| LEVEL | THRESHOLD VALUE |
| 1 | 21 |
| 2 | 28 |
| 3 | 29 |
| 4 | 30 |
| 5 | 31 |
| 6 | 32 |
| 7 | 33 |
| 8 | 34 |
| 9 | 35 |
| 10 | 36 |
| 11 | 37 |
| 12 | 38 |
| 13 | 39 |
| 14 | 40 |
| 15 | 41 |
| 16 | 42 |
| 17 | 43 |
| 18 | 44 |
| 19 | 45 |
| 20 | 46 |
| 21 | 47 |
| 22 | 48 |
| 23 | 49 |
| 24 | 50 |
| 25 | 51 |
| 26 | 52 |
| 27 | 53 |
| 28 | 54 |
| 29 | 55 |
| 30 | 56 |
| 31 | 57 |

| PIXEL g | |
|---|---|
| LEVEL | THRESHOLD VALUE |
| 1 | 202 |
| 2 | 202 |
| 3 | 202 |
| 4 | 202 |
| 5 | 202 |
| 6 | 203 |
| 7 | 204 |
| 8 | 205 |
| 9 | 206 |
| 10 | 207 |
| 11 | 208 |
| 12 | 209 |
| 13 | 210 |
| 14 | 211 |
| 15 | 212 |
| 16 | 213 |
| 17 | 214 |
| 18 | 215 |
| 19 | 216 |
| 20 | 217 |
| 21 | 218 |
| 22 | 219 |
| 23 | 220 |
| 24 | 221 |
| 25 | 222 |
| 26 | 223 |
| 27 | 224 |
| 28 | 225 |
| 29 | 226 |
| 30 | 227 |
| 31 | 228 |

| PIXEL h | |
|---|---|
| LEVEL | THRESHOLD VALUE |
| 1 | 58 |
| 2 | 58 |
| 3 | 58 |
| 4 | 58 |
| 5 | 58 |
| 6 | 59 |
| 7 | 60 |
| 8 | 61 |
| 9 | 62 |
| 10 | 63 |
| 11 | 64 |
| 12 | 65 |
| 13 | 66 |
| 14 | 67 |
| 15 | 68 |
| 16 | 69 |
| 17 | 70 |
| 18 | 71 |
| 19 | 72 |
| 20 | 73 |
| 21 | 74 |
| 22 | 75 |
| 23 | 76 |
| 24 | 77 |
| 25 | 78 |
| 26 | 79 |
| 27 | 80 |
| 28 | 81 |
| 29 | 82 |
| 30 | 83 |
| 31 | 84 |

| PIXEL i | |
|---|---|
| LEVEL | THRESHOLD VALUE |
| 1 | 78 |
| 2 | 172 |
| 3 | 173 |
| 4 | 174 |
| 5 | 175 |
| 6 | 176 |
| 7 | 177 |
| 8 | 178 |
| 9 | 179 |
| 10 | 180 |
| 11 | 181 |
| 12 | 182 |
| 13 | 183 |
| 14 | 184 |
| 15 | 185 |
| 16 | 186 |
| 17 | 187 |
| 18 | 188 |
| 19 | 189 |
| 20 | 190 |
| 21 | 191 |
| 22 | 192 |
| 23 | 193 |
| 24 | 194 |
| 25 | 195 |
| 26 | 196 |
| 27 | 197 |
| 28 | 198 |
| 29 | 199 |
| 30 | 200 |
| 31 | 201 |

FIG. 12

| | | |
|---|---|---|
| 9 | 5 | 6 |
| 4 | 1 | 2 |
| 8 | 3 | 7 |

FIG. 13

| PIXEL a | |
|---|---|
| LEVEL | THRESHOLD VALUE |
| 1 | 229 |
| 2 | 229 |
| 3 | 229 |
| 4 | 229 |
| 5 | 229 |
| 6 | 230 |
| 7 | 231 |
| 8 | 232 |
| 9 | 233 |
| 10 | 234 |
| 11 | 235 |
| 12 | 236 |
| 13 | 237 |
| 14 | 238 |
| 15 | 239 |
| 16 | 240 |
| 17 | 241 |
| 18 | 242 |
| 19 | 243 |
| 20 | 244 |
| 21 | 245 |
| 22 | 246 |
| 23 | 247 |
| 24 | 248 |
| 25 | 249 |
| 26 | 250 |
| 27 | 251 |
| 28 | 252 |
| 29 | 253 |
| 30 | 254 |
| 31 | 255 |

| PIXEL b | |
|---|---|
| LEVEL | THRESHOLD VALUE |
| 1 | 115 |
| 2 | 115 |
| 3 | 115 |
| 4 | 115 |
| 5 | 115 |
| 6 | 116 |
| 7 | 117 |
| 8 | 118 |
| 9 | 119 |
| 10 | 120 |
| 11 | 121 |
| 12 | 122 |
| 13 | 123 |
| 14 | 124 |
| 15 | 125 |
| 16 | 126 |
| 17 | 127 |
| 18 | 128 |
| 19 | 129 |
| 20 | 130 |
| 21 | 131 |
| 22 | 132 |
| 23 | 133 |
| 24 | 134 |
| 25 | 135 |
| 26 | 136 |
| 27 | 137 |
| 28 | 138 |
| 29 | 139 |
| 30 | 140 |
| 31 | 141 |

| PIXEL c | |
|---|---|
| LEVEL | THRESHOLD VALUE |
| 1 | 142 |
| 2 | 142 |
| 3 | 143 |
| 4 | 144 |
| 5 | 145 |
| 6 | 146 |
| 7 | 147 |
| 8 | 148 |
| 9 | 149 |
| 10 | 150 |
| 11 | 151 |
| 12 | 152 |
| 13 | 153 |
| 14 | 154 |
| 15 | 155 |
| 16 | 156 |
| 17 | 157 |
| 18 | 158 |
| 19 | 159 |
| 20 | 160 |
| 21 | 161 |
| 22 | 162 |
| 23 | 163 |
| 24 | 164 |
| 25 | 165 |
| 26 | 166 |
| 27 | 167 |
| 28 | 168 |
| 29 | 169 |
| 30 | 170 |
| 31 | 171 |

| PIXEL d | |
|---|---|
| LEVEL | THRESHOLD VALUE |
| 1 | 85 |
| 2 | 85 |
| 3 | 86 |
| 4 | 87 |
| 5 | 88 |
| 6 | 89 |
| 7 | 90 |
| 8 | 91 |
| 9 | 92 |
| 10 | 93 |
| 11 | 94 |
| 12 | 95 |
| 13 | 96 |
| 14 | 97 |
| 15 | 98 |
| 16 | 99 |
| 17 | 100 |
| 18 | 101 |
| 19 | 102 |
| 20 | 103 |
| 21 | 104 |
| 22 | 105 |
| 23 | 106 |
| 24 | 107 |
| 25 | 108 |
| 26 | 109 |
| 27 | 110 |
| 28 | 111 |
| 29 | 112 |
| 30 | 113 |
| 31 | 114 |

| PIXEL e | |
|---|---|
| LEVEL | THRESHOLD VALUE |
| 1 | 1 |
| 2 | 1 |
| 3 | 1 |
| 4 | 1 |
| 5 | 1 |
| 6 | 2 |
| 7 | 3 |
| 8 | 4 |
| 9 | 5 |
| 10 | 6 |
| 11 | 7 |
| 12 | 8 |
| 13 | 9 |
| 14 | 10 |
| 15 | 11 |
| 16 | 12 |
| 17 | 13 |
| 18 | 14 |
| 19 | 15 |
| 20 | 16 |
| 21 | 17 |
| 22 | 18 |
| 23 | 19 |
| 24 | 20 |
| 25 | 21 |
| 26 | 22 |
| 27 | 23 |
| 28 | 24 |
| 29 | 25 |
| 30 | 26 |
| 31 | 27 |

| PIXEL f | |
|---|---|
| LEVEL | THRESHOLD VALUE |
| 1 | 28 |
| 2 | 28 |
| 3 | 29 |
| 4 | 30 |
| 5 | 31 |
| 6 | 32 |
| 7 | 33 |
| 8 | 34 |
| 9 | 35 |
| 10 | 36 |
| 11 | 37 |
| 12 | 38 |
| 13 | 39 |
| 14 | 40 |
| 15 | 41 |
| 16 | 42 |
| 17 | 43 |
| 18 | 44 |
| 19 | 45 |
| 20 | 46 |
| 21 | 47 |
| 22 | 48 |
| 23 | 49 |
| 24 | 50 |
| 25 | 51 |
| 26 | 52 |
| 27 | 53 |
| 28 | 54 |
| 29 | 55 |
| 30 | 56 |
| 31 | 57 |

| PIXEL g | |
|---|---|
| LEVEL | THRESHOLD VALUE |
| 1 | 202 |
| 2 | 202 |
| 3 | 202 |
| 4 | 202 |
| 5 | 202 |
| 6 | 203 |
| 7 | 204 |
| 8 | 205 |
| 9 | 206 |
| 10 | 207 |
| 11 | 208 |
| 12 | 209 |
| 13 | 210 |
| 14 | 211 |
| 15 | 212 |
| 16 | 213 |
| 17 | 214 |
| 18 | 215 |
| 19 | 216 |
| 20 | 217 |
| 21 | 218 |
| 22 | 219 |
| 23 | 220 |
| 24 | 221 |
| 25 | 222 |
| 26 | 223 |
| 27 | 224 |
| 28 | 225 |
| 29 | 226 |
| 30 | 227 |
| 31 | 228 |

| PIXEL h | |
|---|---|
| LEVEL | THRESHOLD VALUE |
| 1 | 58 |
| 2 | 58 |
| 3 | 58 |
| 4 | 58 |
| 5 | 58 |
| 6 | 59 |
| 7 | 60 |
| 8 | 61 |
| 9 | 62 |
| 10 | 63 |
| 11 | 64 |
| 12 | 65 |
| 13 | 66 |
| 14 | 67 |
| 15 | 68 |
| 16 | 69 |
| 17 | 70 |
| 18 | 71 |
| 19 | 72 |
| 20 | 73 |
| 21 | 74 |
| 22 | 75 |
| 23 | 76 |
| 24 | 77 |
| 25 | 78 |
| 26 | 79 |
| 27 | 80 |
| 28 | 81 |
| 29 | 82 |
| 30 | 83 |
| 31 | 84 |

| PIXEL i | |
|---|---|
| LEVEL | THRESHOLD VALUE |
| 1 | 172 |
| 2 | 172 |
| 3 | 173 |
| 4 | 174 |
| 5 | 175 |
| 6 | 176 |
| 7 | 177 |
| 8 | 178 |
| 9 | 179 |
| 10 | 180 |
| 11 | 181 |
| 12 | 182 |
| 13 | 183 |
| 14 | 184 |
| 15 | 185 |
| 16 | 186 |
| 17 | 187 |
| 18 | 188 |
| 19 | 189 |
| 20 | 190 |
| 21 | 191 |
| 22 | 192 |
| 23 | 193 |
| 24 | 194 |
| 25 | 195 |
| 26 | 196 |
| 27 | 197 |
| 28 | 198 |
| 29 | 199 |
| 30 | 200 |
| 31 | 201 |

FIG. 14A

LEVEL 0

| | | |
|---|---|---|
| C | C | C |
| C | C | C |
| C | C | C |

FIG. 14B

LEVEL 1 − 31

| | | |
|---|---|---|
| R | L | L |
| R | C | L |
| R | L | L |

APPARATUS TO FORM LATENT IMAGE USING DITHER MATRICES HAVING MINUTE AND NORMAL EXPOSURE AREAS CONTROLLING TONER ADHESION

BACKGROUND OF THE INVENTION

1. Field of the Invention

The present invention relates to an image forming apparatus using an electrophotographic process, such as a laser beam printer, a copying machine, or a facsimile.

2. Description of the Related Art

A method for forming a color image with an electrophotographic image forming apparatus is known by which a color image is formed by overlapping images of a plurality of colors by repeating a process of transferring a toner image formed on a photosensitive drum through charging, exposure, and development onto a recording medium a plurality of times. It is known that a phenomenon occurs in such a color-image forming apparatus in which white gaps, which should not be present, are generated between adjacent images of different colors occurs. This phenomenon is hereinafter referred to as white gap. This phenomenon occurs when a visualized image thinner than an electrostatic latent image formed on the photosensitive drum is formed when an electrostatic latent image, such as a latent image of an image edge, which is formed on a photosensitive drum due to an abrupt change in potential, is developed by a developing unit. For example, in the case of an image in which a cyan belt and a black belt are next to each other, a thin cyan visualized image and a thin black visualized image are formed, although the color belts should be next to each other. This causes a gap between the color belts in a final image on a recording medium, resulting in degradation in image quality. FIG. 19 is a diagram illustrating a state in which white gaps are generated, showing the state of an electric field between a photosensitive drum and a developing roller. The thinning of a visualized image at a visualizing portion, which causes white gaps, occurs because an electrostatic latent image formed on an electrostatic portion of a photosensitive drum wraps the electric field at the edge.

Japanese Patent Laid-Open No. 2003-312050 discloses an image forming apparatus in which a minute laser beam is emitted to a non-toner-image formation section on a print area to the extent that toner does not adheres excessively, thereby attaining an appropriate potential of the photosensitive drum. Such weak exposure of a non-toner-image formation section (a white portion) is referred to as background exposure.

The background exposure is performed also not for preventing the above white gaps. Japanese Patent Laid-Open No. 2012-189886 discloses an in-line color-image forming apparatus that performs background exposure to attain an appropriate potential of a non-toner-image formation section of a photosensitive member when using a common charging bias power supply or a common developing bias power supply.

An example of a method for performing background exposure (weak exposure) is a method of changing the duty ratio of pulse waves, called pulse width modulation (PWM). This is a method of causing an exposure device to emit light to one pixel in synchronization with an imaging clock only a period of background exposure (a pulse width) corresponding to a minute exposure amount to the extent that no toner adheres, which is shorter than a normal exposure period (a pulse width) for adhesion of toner.

However, the background exposure based on PWM can generate image defect depending on the allocation of an emission period for normal exposure for toner adhesion and an emission period for background exposure for preventing toner adhesion.

In other words, simply placing the emission period for background exposure in an emission period not for normal exposure, which corresponds to a white portion of the image, can cause exposure light during the emission period for background exposure to interfere with exposure light during light emission for normal exposure. The interference here is a state in which an area of the photosensitive member corresponding to the emission period for normal exposure and an area corresponding to the emission period for background exposure are excessively close to each other.

Such interference decreases the potential of an area of the photosensitive member between the area corresponding to the emission period for normal exposure and the area corresponding to the emission period for background exposure. Thus, the potential of the sandwiched area decreases to an exposure level at which toner adheres, so that an area in which toner adheres finally unintentionally increases in size. This can cause image defect.

SUMMARY OF THE INVENTION

In view of the above problems, the present invention reduces image defect when background exposure is performed using PWM method.

In an aspect, the present invention provides an image forming apparatus that forms an image by forming a latent image on a charged photosensitive member and attaching toner to the latent image. The apparatus includes an exposure device that forms a latent image by applying light generated based on a driving signal to the charged photosensitive member; and a signal generating unit that stores information on a plurality of dither matrices preset in correspondence with a density level of the toner to be attached to the photosensitive member and converts input image data based on the dither matrices to generate the driving signal. The signal generating unit stores information on a first dither matrix corresponding to a first density level and a second dither matrix corresponding to a second density level higher than the first density level. The first dither matrix includes a minute exposure area, at predetermined coordinates, in which the exposure device is caused to emit light to attain a potential of the photosensitive member at which no toner adheres to the photosensitive member; and the second dither matrix includes a normal exposure area, at a position corresponding to the predetermined coordinates in the first dither matrix, in which the exposure device is caused to emit light to attain a potential of the photosensitive member at which toner adheres to the photosensitive member.

In another aspect, the present invention provides an image forming apparatus that forms an image by forming a latent image on a charged photosensitive member and attaching toner to the latent image. The apparatus includes an exposure device that forms a latent image by applying light generated based on a driving signal to the charged photosensitive member; and a signal generating unit that stores information on a plurality of dither matrices preset in correspondence with a density level of the toner to be attached to the photosensitive member and converts input image data based on the dither matrices to generate the driving signal. The signal generating unit stores information on a first dither matrix corresponding to a first density level and a second dither matrix corresponding to a second density level higher than the first density level. The first dither matrix includes a minute exposure area, at first coordinates, in which the exposure device is caused to emit light to attain a potential of the photosensitive member at which no toner adheres to the photosensitive member; and a normal exposure area, at a second coordinates, wherein the exposure device is caused to emit light to attain a potential of the photosensitive member at which toner adheres to the photosensitive member, the first coordinates and the second coordinates being disposed side by side in a scanning direction, and wherein a non-light-emitting area in which the exposure device is not caused to emit light is formed between the minute exposure area and the normal exposure area. The second dither matrix includes the non-light-emitting area at a position corresponding to the first coordinates and includes a normal light emitting area at a position corresponding to the second coordinates, the normal light emitting area being larger than the normal light emitting area at the second coordinates in the first dither matrix.

Further features of the present invention will become apparent from the following description of exemplary embodiments with reference to the attached drawings.

BRIEF DESCRIPTION OF THE DRAWINGS

FIG. 4 is a diagram illustrating a dither matrix.

FIG. 5A is a diagram illustrating the order of growth in a dither matrix.

FIG. 5B is a diagram illustrating a position control matrix.

FIG. 6 is a table showing the levels of gray of individual pixels constituting a dither matrix and threshold values set for the levels.

FIG. 12 is a diagram illustrating the order of growth in a dither matrix.

FIG. 13 is a table showing the levels of gray of individual pixels constituting a dither matrix and threshold values set for the levels.

FIG. 14A is a diagram illustrating a position control matrix.

FIG. 14B is a diagram illustrating a position control matrix.

DESCRIPTION OF THE EMBODIMENTS

First Embodiment

Image Forming Apparatus

Figure 1:
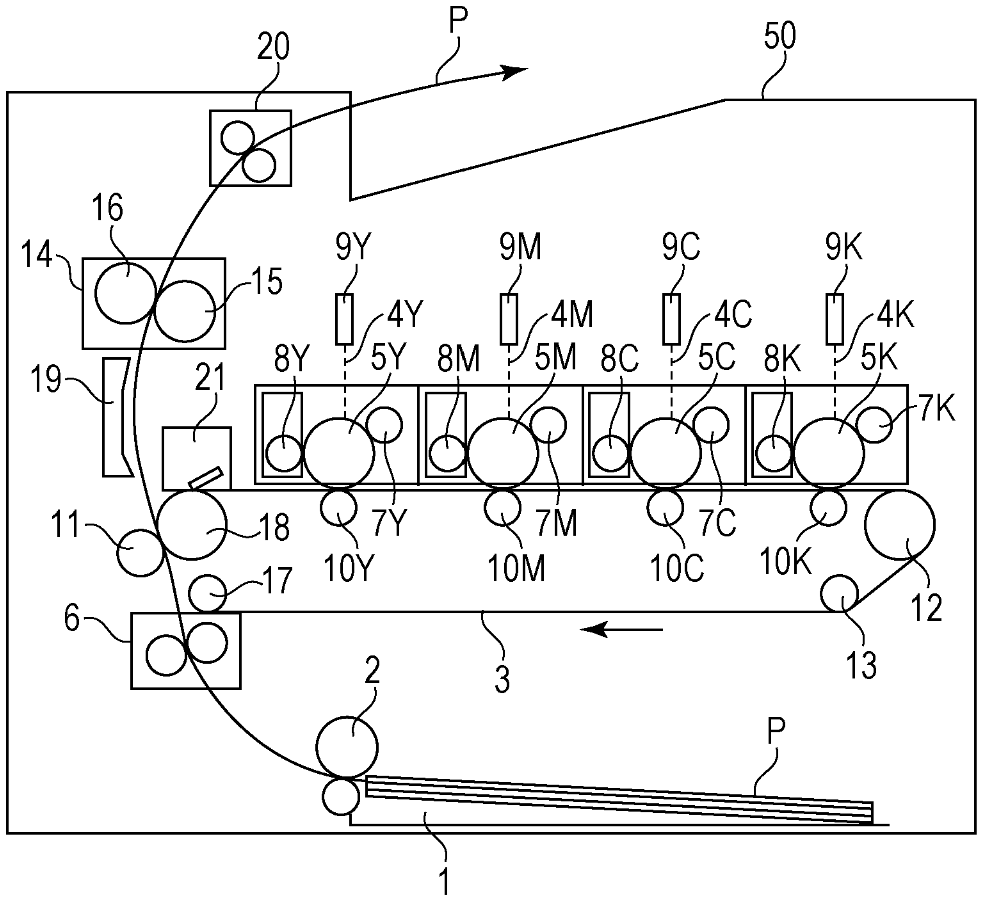
FIG. 1 is a schematic configuration diagram of an image forming apparatus.

FIG. 1 is a schematic configuration diagram of a color laser printer (an image forming apparatus) according to a first embodiment of the present invention. As illustrated, a color laser printer 50 is a four-drum tandem system (in-line system) printer including photosensitive drums 5 (5Y, 5M, 5C, and 5K) which are photosensitive members. This image forming apparatus is a printer with a resolution of 600 dpi and a speed of 20 ppm corresponding to A4-size paper (210 mm×297 mm).

Around the photosensitive drums (photosensitive members) 5 (5Y, 5M, 5C, and 5K), charging rollers (charging devices) 7 (7Y, 7M, 7C, and 7K), developing rollers (developing devices) 8 (8Y, 8M, 8C, and 8K), exposure devices 9 (9Y, 9M, 9C, and 9K), and primary transfer rollers (primary transfer devices) 10 (10Y, 10M, 10C, and 10K) are disposed, respectively.

An intermediate transfer belt 3 is an endless belt, which is stretched round a drive roller 12, a tension roller 13, an idler roller 17, and a secondary transfer facing roller 18 and rotates in the direction of the arrow in FIG. 1 at a processing speed of 115 mm/sec. Examples of a material of the intermediate transfer belt 3 include polyimide, polyamide, polycarbonate (PC), and polyvinylidene fluoride (PVDF). The drive roller 12, the tension roller 13, and the secondary transfer facing roller 18 are support rollers that support the intermediate transfer belt 3.

The four photosensitive drums 5 (5Y, 5M, 5C, and 5K) correspond to individual colors and are disposed in series in the moving direction of the intermediate transfer belt 3.

The photosensitive drum 5Y is uniformly charged to a predetermined polarity and potential by the charging roller 7Y during the process of rotation. Next, the photosensitive drum 5Y is irradiated with a laser beam 4Y by the exposure device 9Y, so that an electrostatic latent image corresponding to a first color (yellow) component image of a target color image. Next, the electrostatic latent image is developed by a yellow toner (developer) or the first color with the developing roller 8Y. This system for developing toner at a portion at which an electrostatic latent image is formed by exposure is referred to as "reversal development system". The yellow image formed on the photosensitive drum 5Y enters a primary transfer nip. The primary transfer nip is formed by nipping the intermediate transfer belt 3 with the photosensitive drum 5Y and the primary transfer roller 10Y. At the primary transfer nip, the yellow toner image is transfer onto the intermediate transfer belt 3 from the photosensitive drum 5Y by applying a primary transfer bias to the primary transfer roller 10Y. For the photosensitive drums 5M, 5C, and 5K, the same process as that for the photosensitive drum 5Y, described above, is executed to form magenta, cyan, and black toner images on the photosensitive drum 5M, 5C, and 5K, respectively. At the primary transfer nips formed between the photosensitive drums 5M, 5C, and 5K and the primary transfer rollers 10M, 10C, and 10K, the magenta, cyan, and black toner images are transferred in sequence onto the yellow toner image transferred before on the intermediate transfer belt 3, respectively. The four-color toner image transferred on the intermediate transfer belt 3 rotationally moves in the direction of the arrow (clockwise) together with the intermediate transfer belt 3.

On the other hand, a recording medium P stacked in a paper cassette 1 is fed by a paper feed roller 2 into the nip of a registration roller pair 6 and is temporarily stopped. The recording medium P temporarily stopped is fed to a secondary transfer nip by the registration roller pair 6 in synchronization with the timing at which the four-color toner image formed on the intermediate transfer belt 3 reaches the secondary transfer nip. The toner image on the intermediate transfer belt 3 is transferred onto the recording medium P by application of voltage (about +1.5 kV) across a secondary transfer roller 11 and the secondary transfer facing roller 18. The recording medium P on which the toner image is transferred is separated from the intermediate transfer belt 3, passes through a conveyance guide 19, and is fed to a fixing unit 14, where the recording medium P is heated by a fixing roller 15 and pressed by a pressure roller 16, so that the toner image is fixedly fused on the surface of the recording medium P. Thus, a four-full-color image is obtained. Thereafter, the recording medium P is discharge from a discharging roller pair 20 to the outside of the apparatus 50, and one cycle of printing ends. On the other hand, toner left on the intermediate transfer belt 3, without being transferred onto the recording medium P at the secondary transfer portion is removed by a cleaning unit 21 disposed downstream from the secondary transfer portion.

The image forming apparatus of this embodiment uses photosensitive drums 5 and toner with negative polarity. The photosensitive drums 5 have a charged potential (Vd) of −500 V and a developing potential (Vdc) of −300 V, and an exposure potential (V1) of −100 V when laser emission occurs in the entire areas of one pixel. Light emission during a minute period for background exposure allows a background potential (Vbg) of −450 V to be obtained. The spot diameter of the laser beam is about 60 um on the photosensitive drum 5, and one pixel on the photosensitive drum 5 is about 42 μm×42 μm.

The exposure devices 9 (9Y, 9M, 9C, and 9K) each include a light source (a laser diode) (not shown), a polygon mirror, and a lens. The exposure devices 9 radiate laser beams 4 (4Y, 4M, 4C, and 4K) emitted from the light sources onto the photosensitive drums 5 to form images in a desired spot shape. The spot of each laser beam 4 moves in the rotation axial direction of the photosensitive drum 5 (a direction perpendicular to the plane of FIG. 1) by the rotation of the polygon mirror (deflection). At that time, by turning on (emitting) and off (stopping) the laser beam 4 by supplying and blocking a driving current to the light source (laser diode) on the basis of a video signal, one-line of scanning (main scanning) of image data in a main scanning direction is performed. The above one-line scanning is repeated a plurality of times while the photosensitive drum 5 is rotated to move the surface of the photosensitive drum 5 with respect to the spot of the laser beam 4 in a sub-scanning direction (in the circumferential direction of the photosensitive drum 5). Thus, the laser beam 4 can irradiate a two-dimensional area having widths in the main scanning direction and the sub-scanning direction on the surface of the photosensitive drum 5 for scanning. The light source (laser diode) is constantly supplied with a bias current smaller than a threshold current for laser emission of the laser diode to enhance an emission response to the driving current.

The video signal that turns on (emitting) and off (stopping) the laser beam 4, described above, is a pulse signal output in synchronization with an image clock and is a signal whose pulse width is modulated by image processing on the basis of print data. Since the laser beam 4 is emitted on the basis of the video signal, a toner dot image is formed, and thus, a toner image corresponding to print data is formed. In other words, by turning on the laser beam 4 (causing the exposure device 9 to emit the laser beam 4) for a desired time interval in the process of moving the spot of the laser beam 4 on the surface of the photosensitive drum 5, a toner dot image with a desired density is formed in each of pixels on the photosensitive drum 5.

The image forming apparatus of this embodiment performs background exposure also on a non-toner-image formation portion (a white portion) on the photosensitive drum 5 to attain an appropriate potential thereof. This embodiment adopts PWM-system background exposure in which the laser beam 4 is turned on (the exposure device 9 is driven) for a time interval shorter than that of the normal exposure for weak exposure in the process of moving the spot of the laser beam 4 on the surface of the photosensitive drum 5. Thus, the photosensitive drum 5 is given a background potential (Vbg). The background potential (Vbg) is set at a potential at which toner is not allowed to adhere for human beings s to view the image. Setting the potential of a non-toner-image formation portion (a white portion) of the photosensitive drum 5 at the background potential (Vbg) allows an appropriate potential of the non-toner-image formation portion to be attained.

Problems of PWM-System Background Exposure

Description will now be made on background exposure using a PWM pulse signal in a configuration of this embodiment in which a toner dot image is formed by driving the exposure device 9 to emit a laser beam using a video signal which is a PWM pulse signal synchronized with an image clock. For such PWM-system background exposure, PWM control is performed so that the exposure device 9 emits a laser beam for background exposure in an area (a period) in which light emission for forming a toner dot image is not performed. However, this can cause image defect depending on the allocation of an emission period for forming a toner dot image and an emission period for background exposure to the extent that no toner adheres.

Figure 11A:
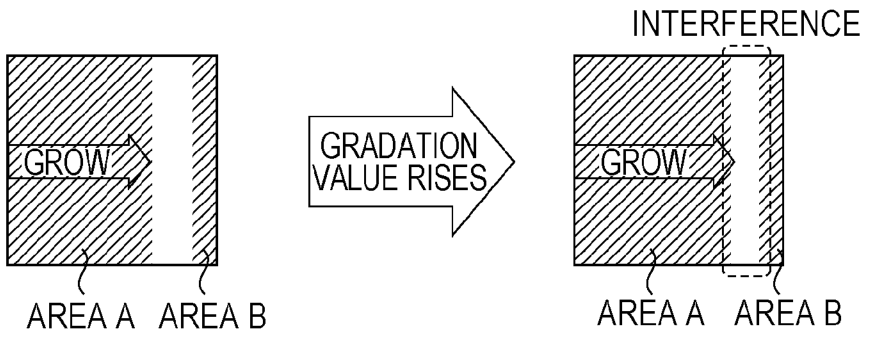
FIG. 11A is a diagram illustrating a comparative example.
Figure 11B:
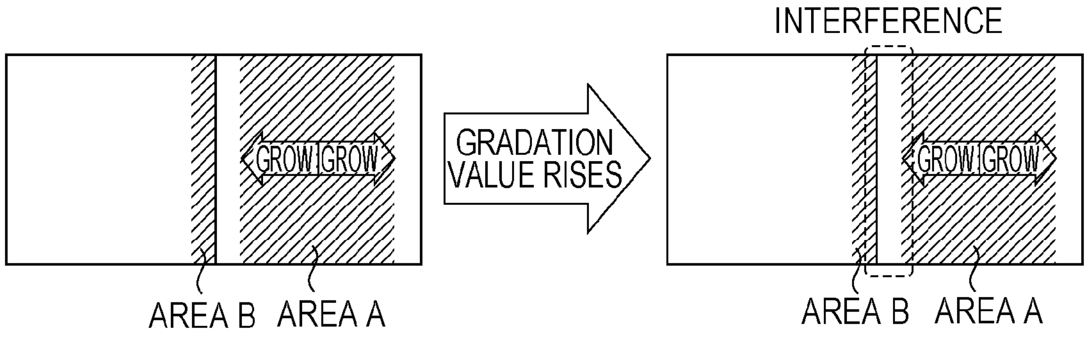
FIG. 11B is a diagram illustrating a comparative example.
Figure 11C:
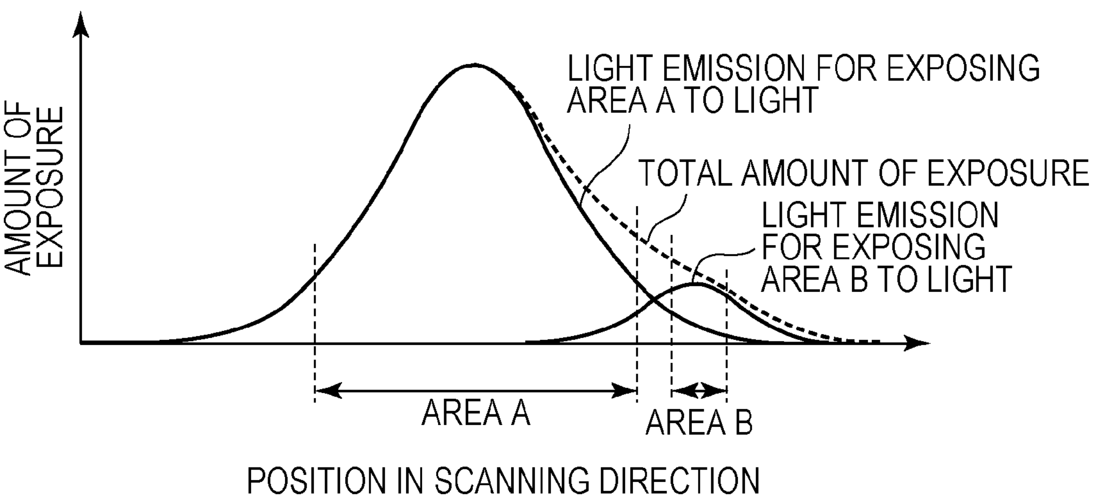
FIG. 11C is a graph showing the relationship between a scanning position and the amount of exposure.

FIG. 11C is a graph showing the amount of exposure in the case of light emission for forming a toner dot image and light emission for background exposure. The area of light emission for forming a toner dot image (a normal light emitting area) is referred to as an area A (a second area), and the area of light emission for background exposure (a minute exposure area) is referred to as an area B (a first area). The spot of the laser beam 4 on the surface of the photosensitive drum 5 has an area whose light quantity depends on a Gaussian distribution with respect to the center of the laser beam 4. Therefore, even if the laser beam 4 is emitted while the center of the spot thereof is passing through the area A and the area B when exposing the area A while moving the spot on the surface of the photosensitive drum 5, an area wider than the areas A and B is actually exposed. Accordingly, an area between the area A and the area B, where the center of the laser beam 4 is not to be applied (a non-light-emitting area) is also exposed. If the areas A and B are disposed close to each other, as shown in FIG. 11C, the amount of exposure of a non-light-emitting area increases, and the potential of the photosensitive drum 5 attenuates to the extent that toner electrostatically adheres to the photosensitive drum 5, thus forming a potential lower than a developing potential (Vdc). This may unintentionally increase the size of a toner dot image, thus posing the probability of image defect, such as "tone jump" in a halftone image which is to be provided with continuous gradation. This state in which a potential lower than the developing potential (Vdc) is produced in the non-light-emitting area between the area A and the area B on the photosensitive drum 5 is defined as a state in which the area A and the area B interfere with each other.

Thus, in this embodiment, image processing is performed so as to reduce image defect due to the interference between the areas A and B, described above.

Image Forming System

Figure 2:
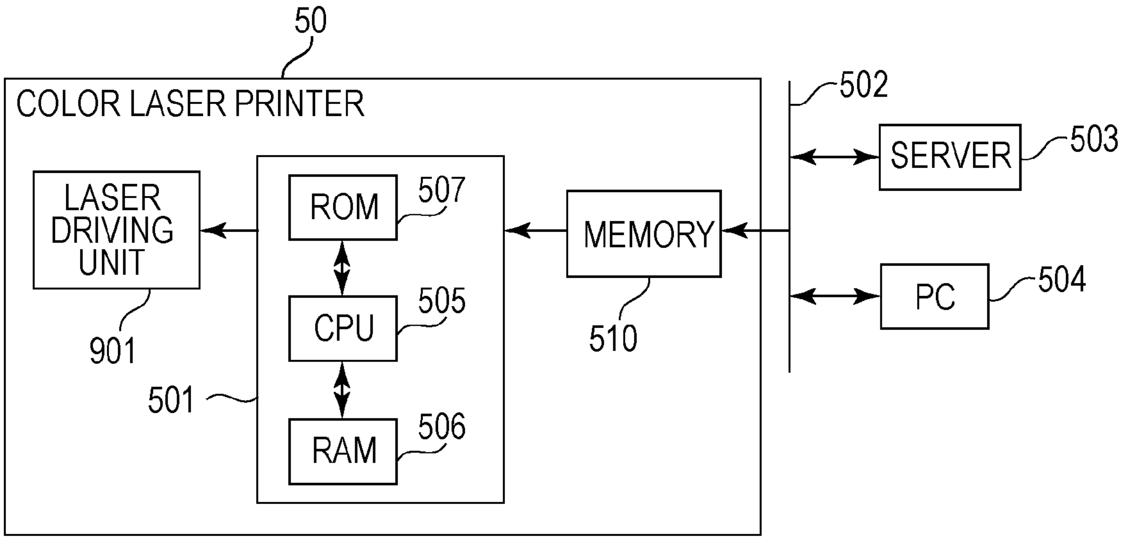
FIG. 2 is a block diagram of an image forming system.

FIG. 2 is a block diagram illustrating a configuration example of the image forming system according to the first embodiment of the present invention.

A controller 501 provided in the color laser printer 50 controls the entire color laser printer 50. The controller 501 controls the color laser printer 50 to execute printing in accordance with a print job input via a network 502 in response to a request from a server 503 or a client PC 504. The print job contains data on an image to be formed by the color laser printer 50 (print data). Information received as the print job is first stored in a memory 510.

The controller 501 includes a CPU 505, a RAM 506, and a ROM 507. The CPU 505 functions as a halftone processing section 501*a*, a position control section 501*b*, and a PWM control unit 501*c*, shown in FIG. 3, to execute the following image processing flow by executing a program stored in the ROM (storing device) 507 using the RAM 506 as a work memory. That is, the controller 501 functions as a signal generating unit that generates a video signal. The memory 510 may be assigned to part of the RAM 506 or a separate memory, such as a hard disk.

Image Processing Flow

Figure 3:
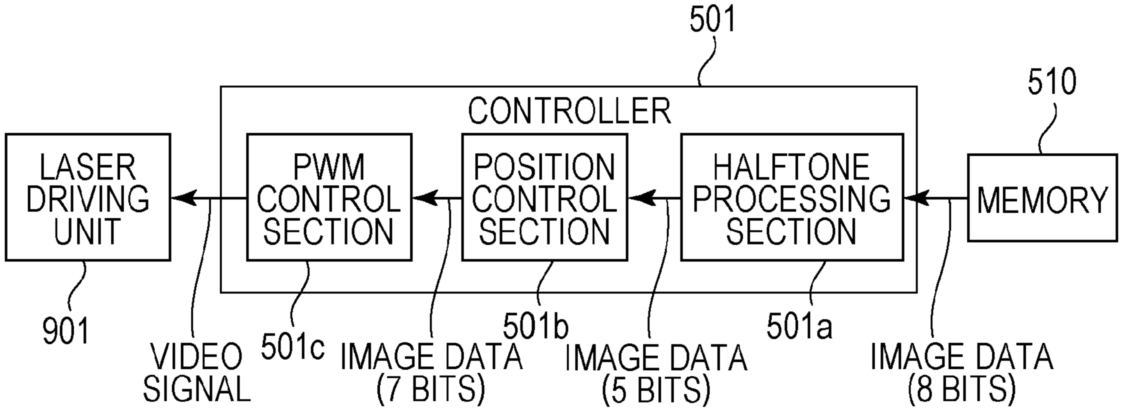
FIG. 3 is a functional block diagram of an image processing flow for printing.

In this embodiment, image processing for obtaining a continuous halftone image is performed by executing gradation conversion based on dithering. FIG. 3 is a functional block diagram illustrating an image processing flow for printing. The halftone processing section 501*a* processes image data or print data with a bit depth of 8 bits (256 levels of gray) read from the memory 510 by multi-level dithering to convert it to image data with a bit depth of 5 bits (32 levels of gray). The position control section 501*b* adds 2-bit position control data indicating a dot growing direction to the image data output from the halftone processing section 501*a* using a position control matrix corresponding to a dither matrix that the halftone processing section 501*a* used for multi-level dithering. The PWM control unit 501*c* converts the 7-bit image data in which the position control data is added to a video signal, which is a pulse signal, by PWM control and outputs the pulsed video signal to a laser driving unit 901. The laser driving unit 901 is provided to each of the exposure devices 9 (9Y, 9M, 9C, and 9K). The above video signal is generated for each color components, described above, and is output to corresponding one of the exposure devices 9 from the controller 501.

The laser driving unit 901 turns on (emits) or off (stops) the laser beams 4 (4Y, 4M, 4C, and 4K) in response to the video signals. The video signals correspond to driving signals for driving the exposure devices 9 to emit light. With this image processing flow using the dithering method, print data is converted to a signal for exposure (a video signal) subjected to halftone processing for appropriate gradation expression in an image forming apparatus.

Multi-Level Dithering

Next, multi-level (5-bit) dithering performed by the halftone processing section 501*a* will be described. Although color laser printers generally adopt dither matrices having different settings for individual colors, a configuration for any one color (for example, black) will be described as a representative example.

A dither matrix is a set of a plurality of pixels. FIG. 4 shows a dither matrix including three pixels in a main scanning direction (in the lateral direction of the drawing) and three pixels in a sub-scanning direction (in the vertical direction of the drawing), nine pixels in total (pixels a to i). The dither matrix is information corresponding to a light-emission pattern depending on ON and OFF of a laser beam and includes an area for which the light source (laser diode) is supplied with a driving current and an area for which the light source (laser diode) is supplied with no driving current. The main scanning direction is a direction corresponding to the moving direction of the spot of a laser beam on the photosensitive member 5 by the rotation of the polygon mirror, and the sub-scanning direction is a direction corresponding to a direction perpendicular to the main scanning direction on the surface of the photosensitive member.

FIG. 5A is a diagram illustrating the order of growth of pixels constituting a dither matrix, in which each pixel is assigned a number indicating the order of growth, from 1 to 9. FIG. 6 is a table showing the levels of gray (levels 1 to 31) of individual pixels constituting the dither matrix shown in FIG. 4 and threshold values set for the levels.

The halftone processing section 501*a* performs a process of assigning the above dither matrix to the individual coordinates of input image data (print data) in which the individual coordinates are assigned 8-bit (256 levels of gray: 0 to 255) gradation values.

The halftone processing section 501*a* adds 5-bit output data to the individual pixels constituting a dither matrix assigned to the individual coordinates on the basis of the gradation values of the coordinates to generate output image data. In other words, if the gradation value is 1 or higher, the halftone processing section 501*a* compares the gradation values of the individual coordinates of the input image data and threshold values set to the individual pixels constituting the dither matrix on the basis of the table shown in FIG. 6. The halftone processing section 501*a* selects a gradation value equal to or greater than the corresponding threshold value and less than the threshold value of a level higher than that by one level from levels 1 to 31 and determines it as the output data of the pixel. If the same threshold value is given across a plurality of levels, a level lower than the threshold value of a level higher than that by one level and the highest of the same threshold value is determined to be the output data of the pixel. At a gradation value 0, all the pixels constituting the dither matrix is determined as data of level 0. The level 0 is set as a level for background exposure. The output image data is image data in which the individual pixels are assigned 5-bit data corresponding to one of the levels 0 to 31.

Position-Control-Data Adding Process

Next, a process of adding position control data performed by the position control section 501*b* will be described. FIG. 5B is a diagram illustrating an example of a position control matrix that the position control section 501*b* uses to add position control data.

The position control matrix is a table of position control data set to the individual pixels (pixels a to i) constituting the dither matrix. The position control data is one of three values "R", "C", and "L", which are represented in two bits. That is, the position control data is set, for example, R="01", C="00", and L="10".

"R", "C", and "L" represent the position and the growing direction of a dot in each pixel. "R" indicates that the dot is disposed at the right end of the pixel and grows toward the left end, "C" indicates that the dot is disposed at the center of the pixel and grows toward both ends, and "L" indicates that the dot is disposed at the left end of the pixel and grows toward the right end.

The position control section 501*b* adds 2-bit position control data to the individual pixels constituting the individual dither matrices of image data subjected to dithering on the basis of the table on the position control data and outputs image data in which the individual pixels are assigned 7-bit data in total. The position control data is added to the most significant bit (MSB) of the image data subjected to dithering.

PWM Processing

Figure 7:
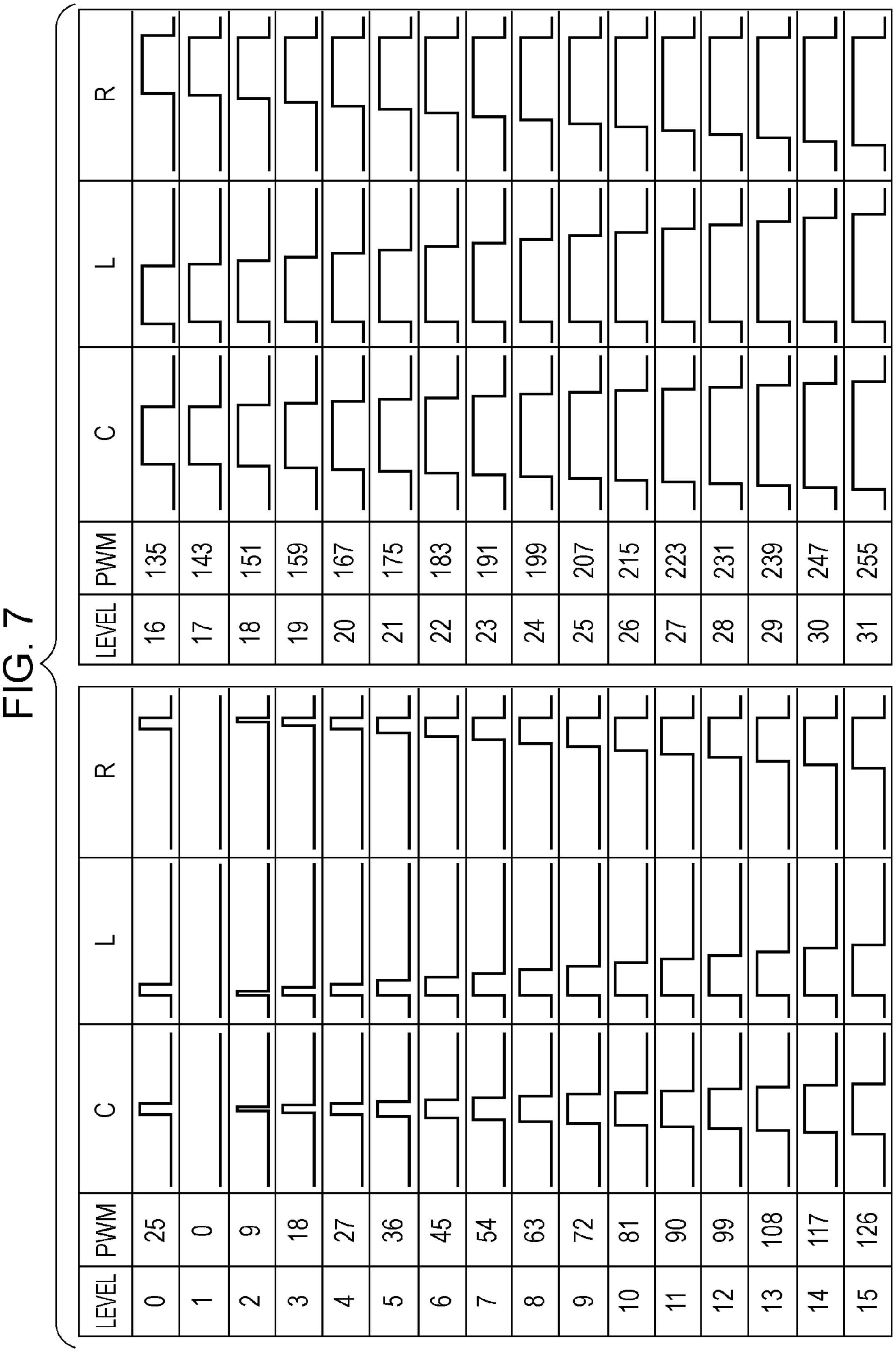
FIG. 7 is a diagram illustrating a PWM table.

Next, PWM processing performed by the PWM control unit 501*c* will be described. FIG. 7 shows an example of a table illustrating the relationship between data (7 bits) assigned to individual pixels and pulse signals generated by PWM processing. This table contains information on the widths of the pulse signals (PWM values) and positions of the pulses (in FIG. 7, waveforms). The PWM control unit 501*c* performs PWM processing on 7-bit input image data assigned to individual pixels, separately for low 5-bit data (level: 0 to 31) and high 2-bit data (position control data: C, L, and R), to generate pulse signals.

For the value of PWM, integers from 0 (no emission) to 255 (full emission across the width of one pixel) are assigned to the levels 0 to 31. The pulse position is information corresponding to the amount of delay of a pulse rising position from the reference position of an image clock, which defines the interval of pixels for synchronizing the pulse signals (for example, the starting point of one pixel). In the table shown in FIG. 7, the width of the pulse increases at the position of the pulse and in the growing direction corresponding to position control data as the level rises, except at level 0.

The level 0 is a level for background exposure, at which the individual pixels emits light at the center, at the left end, and at the right end at a PWM value of 25. Background exposure (minute exposure) of the photosensitive drum 5 by such emission allows the potential of the photosensitive drum 5 under minute exposure to be a potential at which the toner does not electrostatically adhere thereto (the latent image is not visualized) to the extent that human beings can view the image. With the image forming apparatus of this embodiment, little toner adheres to the photosensitive drum 5 to the extent that human beings can view the image provided that the PWM value is within about 60.

By this process, 7-bit image data is converted to a pulsed video signal.

The table shown in FIG. 6, the position control matrix shown in FIG. 5B, and the table shown in FIG. 7 for use in the above image processing are information on a plurality of dither matrices provided for individual levels of gray and are stored in the ROM 507. In other words, the gradation values are the density levels of toner to be attached to the photosensitive drum 5, and a plurality of dither matrices are preset in correspondence with the density levels of the toner, and information on the plurality of dither matrices is stored in the ROM 507.

Output Results

Figure 8:
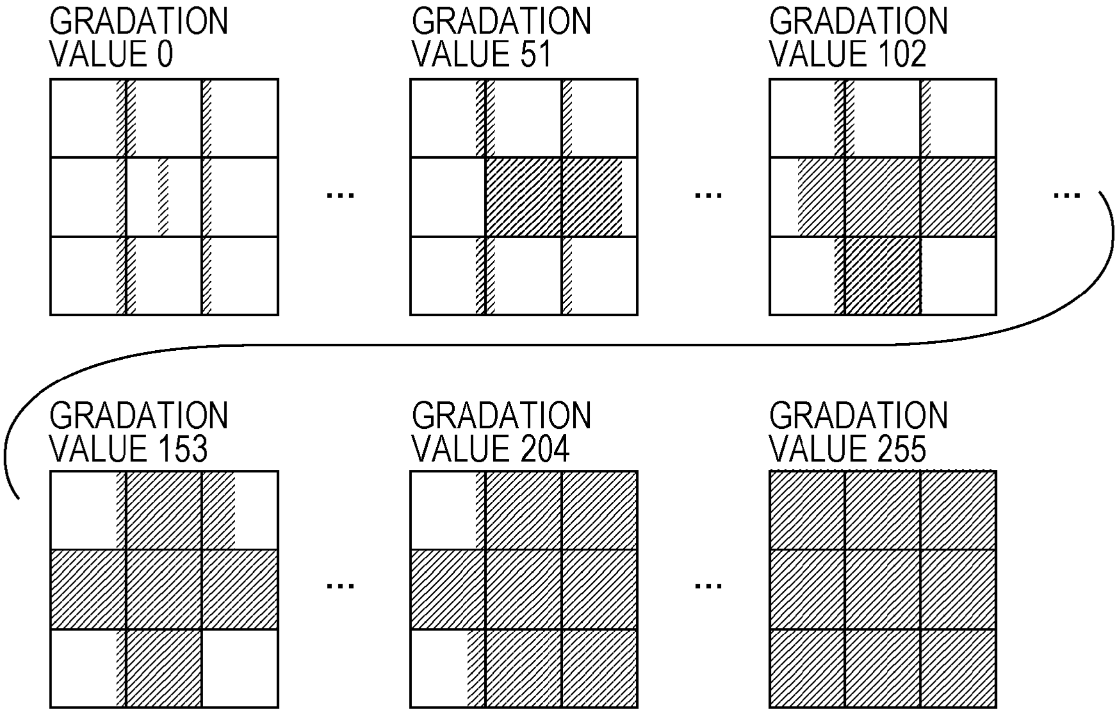
FIG. 8 is a diagram illustrating output results.

FIG. 8 is a diagram of the output results of image formation performed by the image forming apparatus of this embodiment dither-matrix by dither-matrix, showing light emission patterns of dither matrices corresponding to gradation values 0, 51, 102, 153, 204, and 255. The cells in FIG. 8 each indicate a pixel. In the drawing, the gray portion in each cell is an area in which the exposure device 9 emits light. As shown in FIG. 8, the image forming apparatus of this embodiment can obtain a good halftone image by increasing the toner density by increasing the PWM values of the individual pixels in the order of pixels shown in FIG. 5A with increasing gradation value.

All the pixels at the gradation value 0 are at level 0 at which the individual pixels emit light at the center, at the left end, and at the right end at a PWM value of 25 (background exposure). This allows an average background potential (Vbg) of the surface of the photosensitive drum 5 to be given.

Figure 9:
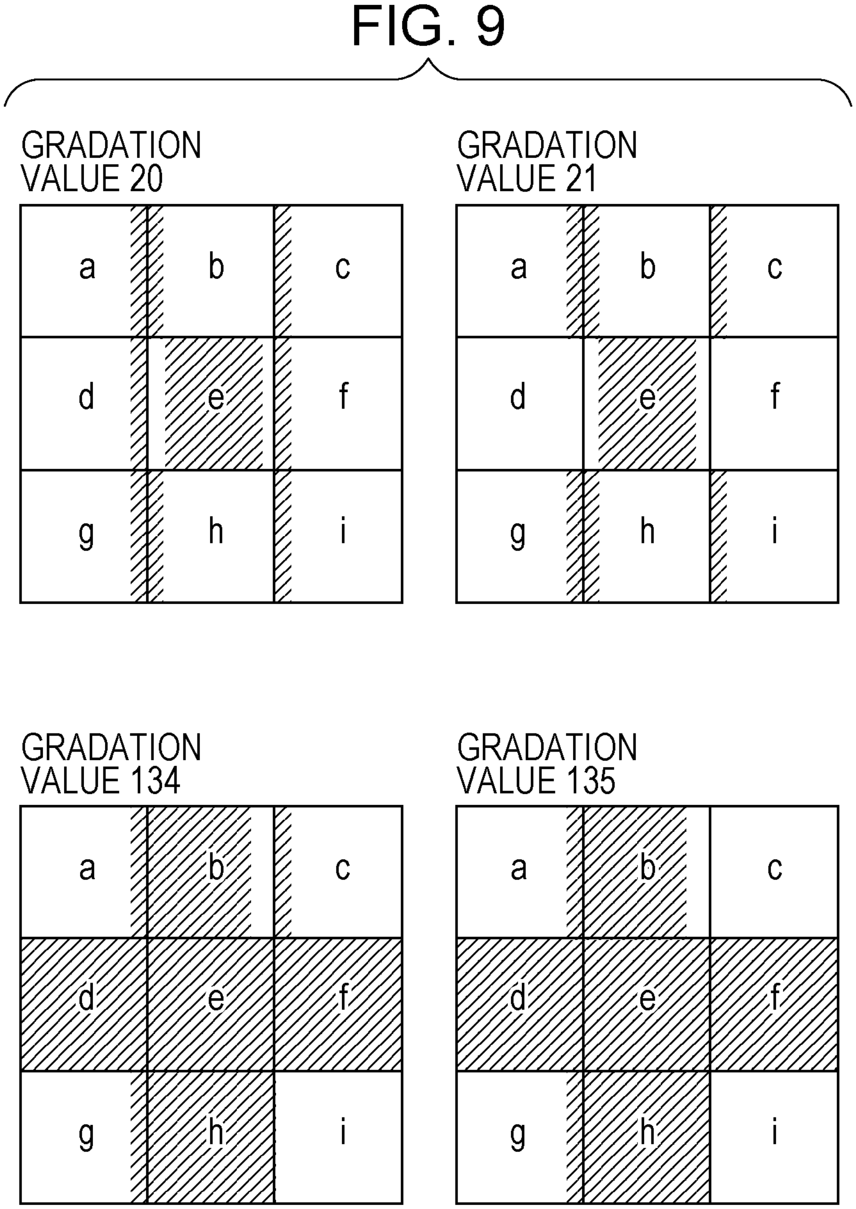
FIG. 9 is a diagram illustrating halftone images at gradation values 20 and 21 and gradation values 134 and 135.

FIG. 9 shows examples of halftone images at gradation values 20 and 21 and gradation values 134 and 135. The individual pixels are denoted by reference signs a to i for purpose of explanation.

The pixel e at the gradation value 20 is at a level of 24, in which toner electrostatically adheres onto the photosensitive drum 5 (the latent image is visualized) due to central light emission at a PWM value of 199, so that a toner dot image constituting a halftone image is formed. The pixels a, b, c, d, f, g, h, and i are at level 0, in which the potential on the photosensitive drum 5 is controlled due to background exposure of left or right light emission at the PWM value of 25. Since the PWM value is less than 60, toner of an amount that human beings can view does not adhere to the photosensitive drum 5 only in the pixels c, d, f, and i in which background exposure is independently performed, but also the adjacent pixels a and b across which background exposure is performed.

When the gradation value 20 rises to 21, the level of the pixel e changes from 24 to 25, and the PWM value changes from 199 to 207. This increases the amount of toner that electrostatically adheres onto the photosensitive drum 5, thus causing a toner dot image that forms a halftone image to grow. On the other hand, the levels of the pixels d and f are changed from 0 to 1, and the PWM values are changed from 25 to 0. This prevents interference between exposure of the pixel e using a pulse signal whose PWM value has increased to 207 and exposure of the pixels d and f using a pulse signal having a minute pulse width. This can prevent image defect, such as a phenomenon in which a toner dot image (an area in which toner adheres) formed at the pixel e from unintentionally growing (increasing in size) sharply when the gradation value rises from 20 to 21 to cause tone jump in the halftone image.

At a gradation value 134, the pixel b is at a level of 24, in which toner electrostatically adheres onto the photosensitive drum 5 (the latent image is visualized) with left emission at a PWM value of 199 to form a toner dot image forming a halftone image. The pixel c is at a level of 0, in which the potential on the photosensitive drum 5 is controlled due to background exposure of left emission at a PWM value of 25. The pixel a is at a level of 0, in which the pixel a emits at the right at a PWM value of 25, but the light couples with that of the adjacent pixel b to contributes to formation of a toner dot image in the pixel b. The pixel g also contributes to formation of a toner dot image in the adjacent pixel h as well. The pixel i is at a level of 1, at which no light is emitted. The pixels d, e, and f are at a level of 31, in which toner electrostatically adheres (the latent image is visualized) on the photosensitive drum due to full emission at the PWM value of 25 to form a toner dot image.

When the gradation value 134 rises to 135, the level of the pixel b changes from 24 to 25, and the PWM value changes from 199 to 207. This increases the amount of toner that electrostatically adheres onto the photosensitive drum 5, thus causing a toner dot image that forms a halftone image to grow. On the other hand, the level of the pixel c is changed from 0 to 1, and the PWM value is changed from 25 to 0. This prevents interference between exposure of the pixel b using a pulse signal whose PWM value has increased to 207 and exposure of the pixel c using a pulse signal having a minute pulse width. This can prevent image defect, such as a phenomenon in which a toner dot image (an area in which toner adheres) formed at the pixel b from unintentionally increasing in size (growing) sharply when the gradation value rises from 134 to 135 to cause tone jump in the halftone image.

Generalization

Next, an explanation will be made on general dither patterns of a plurality of gray levels obtained by the image processing of this embodiment, described above.

Figure 10A:
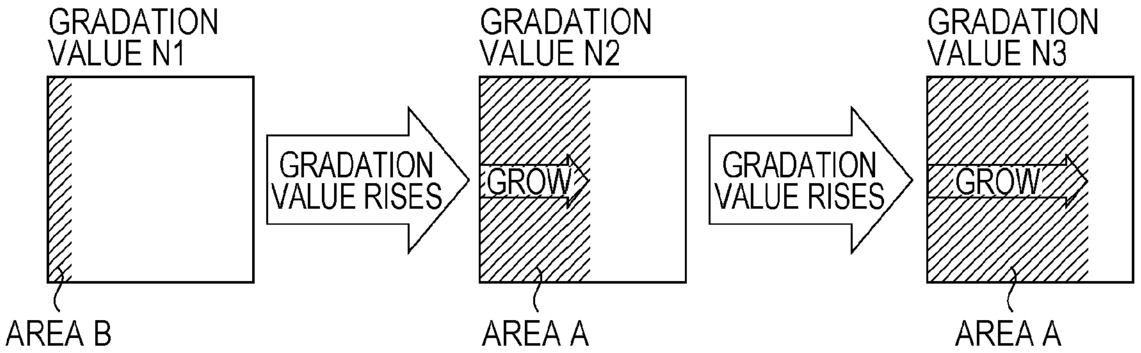
FIG. 10A is a diagram illustrating a target pixel in a plurality of dither matrices corresponding to a plurality of gradation values.
Figure 10B:
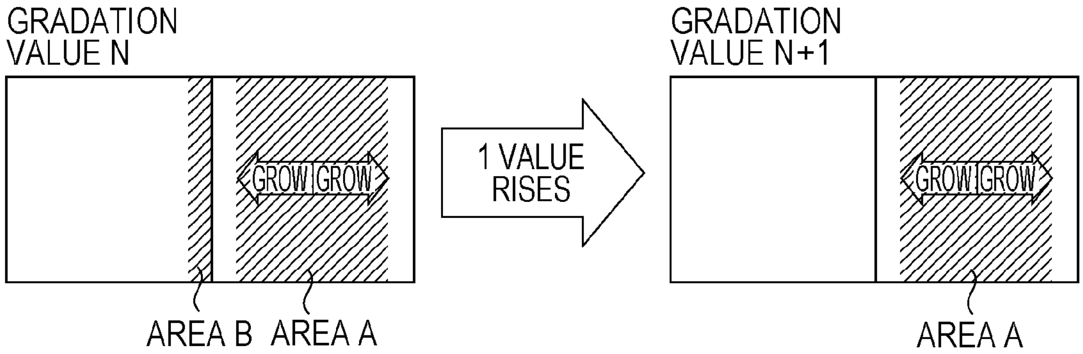
FIG. 10B is a diagram illustrating a target pixel in a plurality of dither matrices corresponding to a plurality of gradation values.

FIGS. 10A and 10B are diagrams illustrating a target pixel located at the same coordinates in a plurality of dither matrices corresponding to a plurality of gradation values for use in the image processing flow of this embodiment, in which a gray portion (a hatched portion) is an area to which the exposure device 9 is caused to emit light. FIG. 10A is a diagram showing a target pixel when the gradation value (the density level of toner to adhere to the photosensitive drum 5) rises from N1 to N2 and from N2 to N3 (N1<N2<N3). FIG. 10B is a diagram showing two other target pixels different from the pixel in FIG. 10A when the gradation value rises from N to N+1 by one level.

An area B, which is a gray portion of the target pixel at the gradation value N1 in FIG. 10A, is a light-emitting area (a minute exposure area) for background exposure, and an area A, which is a gray portion of the target pixel at the gradation values N2 and N3, is a light-emitting area (a normal exposure area) to which toner is to adhere electrostatically. The entire target pixel shown in FIG. 10A is an area in which no image is formed (no latent image is developed with toner). The area B is disposed in the area in which no image is formed. In the areas A and B, a driving current is supplied to the light source (laser diode), and in the other white area of the target pixel, no driving current is supplied. In this embodiment, in a given target pixel, the growth of a toner dot image (a normal exposure area) due to an increase in gradation value starts from a light-emitting area (a minute exposure area) for background exposure. With light emission for background exposure, no toner adheres on the photosensitive drum 5 because of a small PWM value, but if the PWM value increases to greater than 60, formation of a toner dot image is started, and the growth of the toner dot image proceeds as the PWM value further increases. The area A formed in the target pixel when the gradation value rises from N1 to N2 in this way substantially corresponds to an area in which the area B at the gradation value N1 grows (expands). In other words, the area B is provided at predetermined coordinates of a dither matrix at the gradation value N1 (a first dither matrix), and the area A in the target pixel in a dither matrix at the gradation value N2 (a second dither matrix) is disposed at a position corresponding to the predetermined coordinates. Thus, the area A and the area B do not interfere in the target pixel.

At the gradation value N in FIG. 10B, the area A is disposed at second coordinates in a dither matrix, and the area B is disposed at first coordinates. The area A and the area B are disposed side by side in a scanning direction (a lateral direction), with a non-light-emitting area therebetween. The first coordinates and the second coordinates are disposed across two adjacent pixels in the dither matrix. When the gradation value N rises one value to a gradation value N+1 (the density increases), the area A at the second coordinates expands from the area A at the gradation value N, causing the toner dot image to grow, but the area B at the first coordinates is erased to prevent interference with the area A. In other words, the area B is disposed at the first coordinates in the dither matrix at the gradation value N (a first dither matrix), and a non-light-emitting area is disposed at the first coordinates in a dither matrix (a second dither matrix) at the gradation value N+1. The area A at the second coordinates in the dither matrix at the gradation value N+1 is larger than the area A at the second coordinates in the dither matrix at the gradation value N.

A distance that causes the areas A and B to interfere depends on a trade-off among the size of the pixel, the distribution of the light amount of the spot of the laser beam, the scanning speed, and so on. A close study of the inventor shows that about 5% of one pixel in the scanning direction is a critical distance for preventing interference for a general configuration of an image forming apparatus.

To prevent interference between the areas A and B, the area B that is present at the gradation value N is erased at the gradation value N+1 at once. The way for erasing the area B is given for mere illustration and is not intended to limit the present invention. In other words, the area B may be erased stepwise by decreasing the width of the area B stepwise. For example, the width of the area B at the gradation value N+1 may be decreased to half that at the gradation value N, and the area B may be erased at the gradation value N+2 one level higher than that. This is based on the precondition that a non-light-emitting area to the extent that the areas A and B do no interfere is provided between the areas A and B at the gradation value N+1.

Designing dither matrices corresponding to individual gradation values suppresses an unintended increase in the size of a toner dot image at a given gradation value. This prevents a toner dot image from growing sharply, for example, when the gradation value rises, thereby preventing tone jump in a halftone image.

COMPARATIVE EXAMPLES

FIGS. 11A and 11B are diagrams illustrating a target pixel at the same coordinates in a plurality of dither matrices corresponding to a plurality of gradation values in an image processing flow.

In FIG. 11A, a starting point of the growth of a toner dot image due to a rise in gradation value in a given target pixel is at a location other than a light-emitting area for background exposure. Thus, the area A and the area B are disposed in the target pixel with a non-light-emitting area therebetween. Accordingly, as the gradation value rises to cause the area A to grow, the areas A and B interfere, thus unintentionally increasing the size of the toner dot image.

In FIG. 11B, the area A is disposed at first coordinates in a dither matrix, and the area B is disposed at second coordinates, in which the area A and the area B are disposed side by side in the scanning direction (the lateral direction), with a non-light-emitting area therebetween. The first coordinates and the second coordinates are disposed across two adjacent pixels in the dither matrix. When the gradation value rises, the area A grows, and the area B remains without being erased. This can cause the areas A and B to interfere, thus unintentionally increasing the size of the toner dot image.

Thus, with the configurations of the comparative examples, the size of the toner dot image increases unintentionally at a gradation value at which the areas A and B interfere. Thus, when the gradation value changes to a gradation value at which the areas A and B interfere, the toner dot image grows sharply, thus posing the probability of tone jump in the halftone image.

As described above, designing dither matrices corresponding to individual gradation values, as in this embodiment, suppresses an unintended increase in size of a toner dot image at a given gradation value. This prevents a toner dot image from growing sharply, for example, when the gradation value rises, thereby preventing tone jump in a halftone image.

Second Embodiment

The configuration of an image forming apparatus according to a second embodiment of the present invention will be described. The same components as those in the first embodiment are given the same reference signs, and descriptions thereof will be omitted. Since an image forming system, an image processing unit, and an image processing flow are the same as those of the first embodiment, detailed descriptions thereof are omitted. In this embodiment, degradation in image quality is prevented more stably by performing image processing using different position control matrices for level 0 and levels 1 to 31 to attain more uniform background exposure.

Image Processing Flow

FIG. 12 is a diagram illustrating the order of growth of pixels constituting a dither matrix. FIG. 13 is a table showing the levels of gray (levels 1 to 31) of individual pixels constituting the dither matrix and threshold values set for the levels. The halftone processing section 501*a* performs the same process as in the first embodiment on the basis of this table.

FIGS. 14A and 14B are diagrams illustrating examples of position control matrices that the position control section 501*b* uses to add position control data. In this embodiment, different position control matrices are provided for level 0 and levels 1 to 31.

Figure 15:
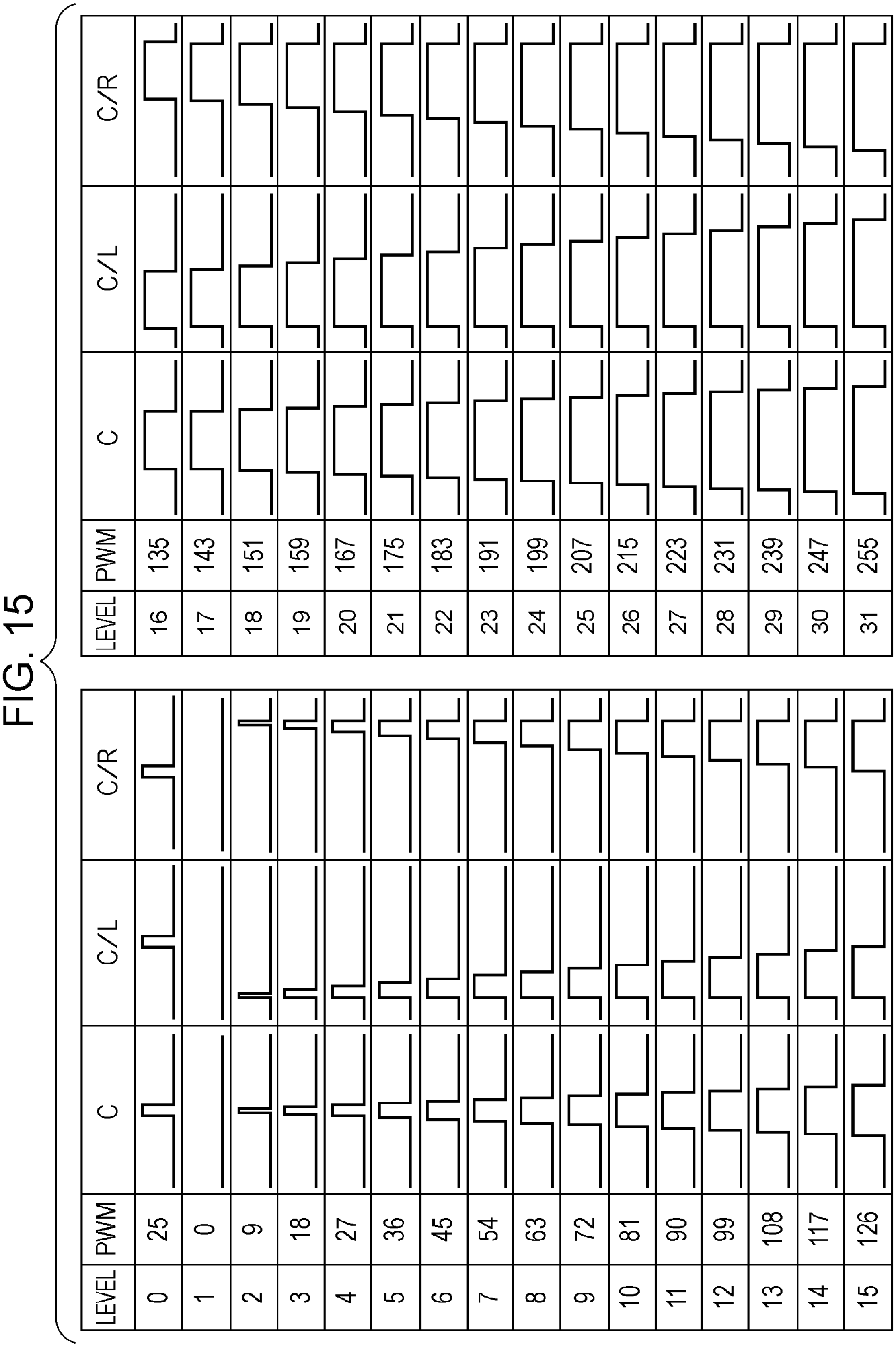
FIG. 15 is a diagram illustrating a PWM table.

FIG. 15 shows an example of a table illustrating the relationship between data (7 bits) assigned to individual pixels and pulse signals generated by PWM processing. In the table shown in FIG. 15, the width of the pulse increases at the position of the pulse and in the growing direction corresponding to position control data as the level rises, except at level 0. Level 0 is a level for background exposure, at which the individual pixels emit light at the center at a PWM value of 25.

The table shown in FIG. 13, the position control matrices shown in FIGS. 14A and 14B, and the table shown in FIG. 15 are stored in the ROM 507.

Output Results

Figure 16:
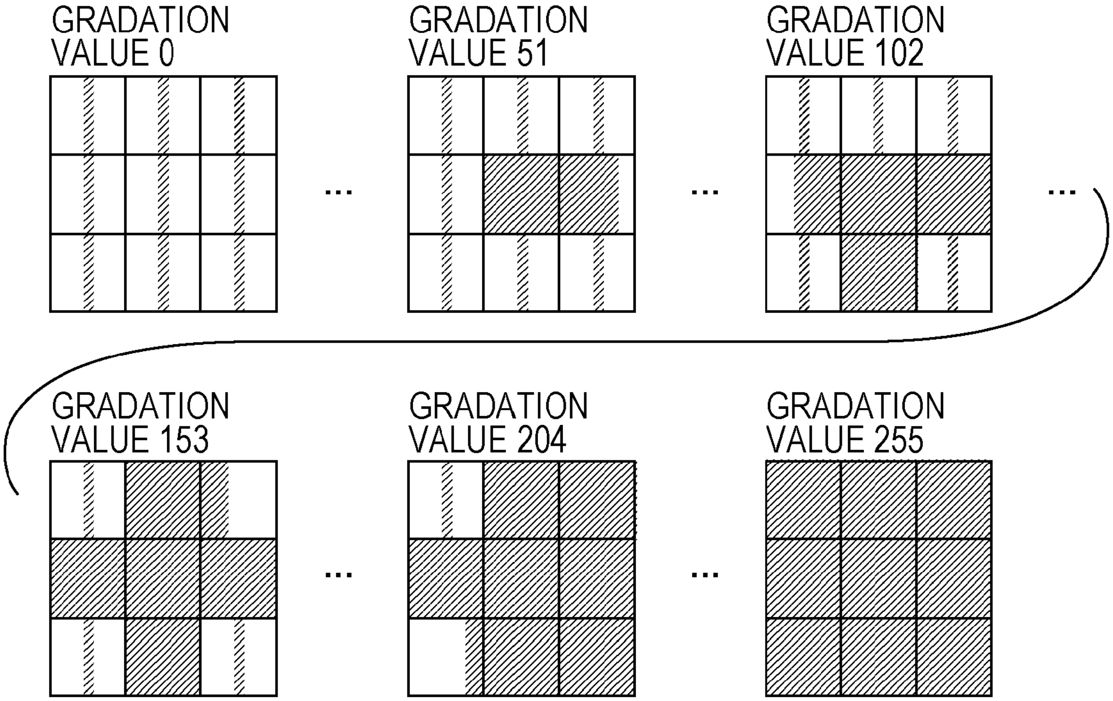
FIG. 16 is a diagram illustrating output results.

FIG. 16 is a diagram illustrating output results of image formation performed by the image forming apparatus of this embodiment, showing light emission patterns at gradation values 0, 51, 102, 153, 204, and 255. The cells in FIG. 16 each indicate a pixel and correspond to one of the cells in a dither matrix. The gray portion in each cell is a laser-emitting area. As shown in FIG. 16, the image forming apparatus of this embodiment can obtain a good halftone image by increasing the toner density by increasing the PWM values of the individual pixels in the order of pixels shown in FIG. 5A with increasing gradation value.

All the pixels at the gradation value 0 are at level 0 at which the individual pixels emit light at the center at a PWM value of 25 (background exposure). This allows an average background potential (Vbg) of the surface of the photosensitive drum 5 to be given. With the image forming apparatus of this embodiment, provided that the PWM value is within about 60, no toner electrostatically adheres on the photosensitive drum 5 due to laser emission (the latent image is not visualized. In this embodiment, since all the pixels at level 0 emit light at the center thereof for background exposure, the average background potential (Vbg) on the surface of the photosensitive drum 5 is more uniform than that of the image forming apparatus of the first embodiment. This can stabilize the potential of the non-toner-image forming area in which a toner image of the image is not formed (a white portion), thereby reducing degradation of the image quality of this area.

Figure 17:
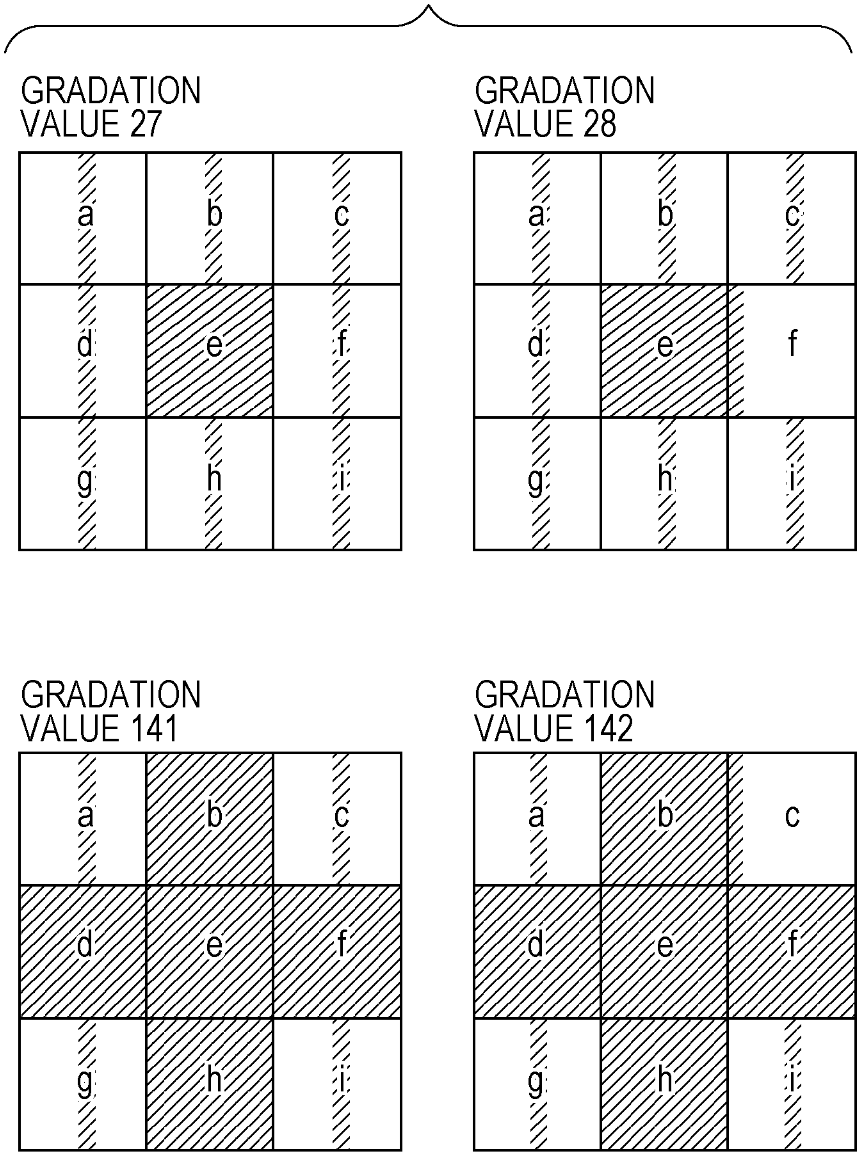
FIG. 17 is a diagram illustrating halftone images at gradation values 27 and 28 and gradation values 141 and 142.

FIG. 17 shows examples of halftone images at gradation values 27 and 28 and gradation values 141 and 142.

The pixel e at the gradation value 27 is at a level of 31, in which toner electrostatically adheres onto the photosensitive drum 5 (the latent image is visualized) due to central light emission at a PWM value of 255, so that a toner dot image constituting a halftone image is formed. The pixels a, b, c, d, f, g, h, and i are at level 0, in which the potential on the photosensitive drum 5 is controlled due to background exposure of central light emission at the PWM value of 25. Since the PWM value is less than 60, toner does not adhere to the photosensitive drum 5 in the pixels a, b, c, d, f, g, h, and i.

When the gradation value 27 rises to 28, the level of the pixel f changes from 0 to 2, and the PWM value changes from 25 (central emission) to 9 (left emission). This contributes to formation of a toner image in the adjacent pixel e to increase the amount of toner that electrostatically adheres onto the photosensitive drum 5, thus causing a toner dot image that forms a halftone image to grow. This also prevents a toner dot image in the pixel f from growing sharply to cause tone jump in the halftone image.

At a gradation value 141, the pixels b, d, e, f, and h are at a level of 31, in which toner electrostatically adheres onto the photosensitive drum 5 (the latent image is visualized) with central emission at a PWM value of 255 to form a toner dot image forming a halftone image. The pixels a, c, g, and i are at a level of 0, in which the potential on the photosensitive drum 5 is controlled due to background exposure of central emission at a PWM value of 25. Since the PWM value is less than 60, no toner electrostatically adheres in the individual pixels a, c, g, and i on the photosensitive drum 5.

When the gradation value 141 rises to 142, the level of the pixel c changes from 0 to 2, and the PWM value changes from 25 (central emission) to 9 (left emission). This contributes to formation of a toner image in the adjacent pixel b to increase the amount of toner that electrostatically adheres onto the photosensitive drum 5, thus causing a toner dot image that forms a halftone image to grow. This also prevents a toner dot image in the pixel c from growing sharply to cause tone jump in the halftone image.

Generalization

Next, an explanation will be made on general dither patterns of a plurality of gray levels obtained by the image processing of this embodiment, described above.

Figure 18:
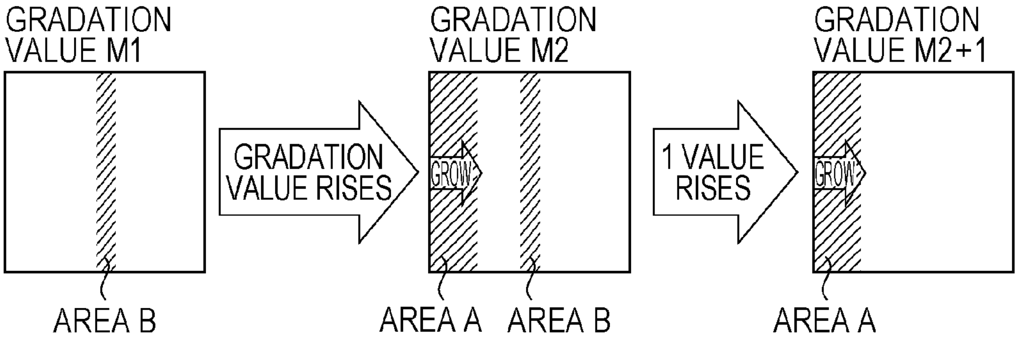
FIG. 18 is a schematic diagram illustrating the effect of image processing of an image forming apparatus of a second embodiment.
Figure 19:
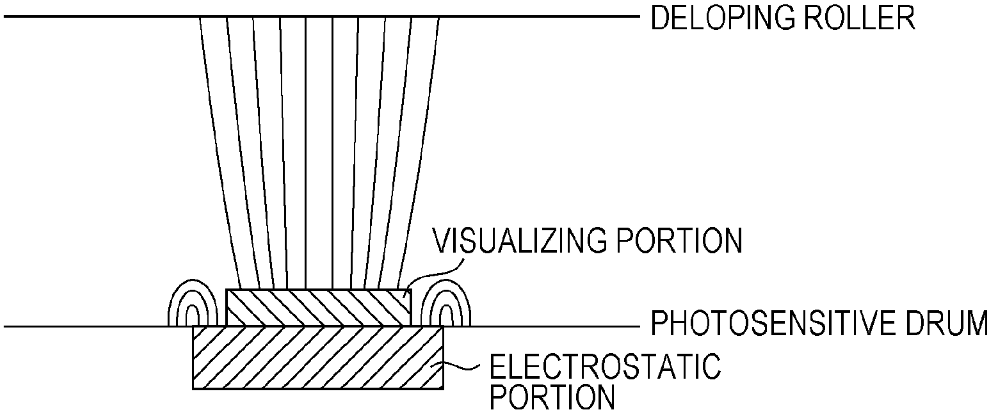
FIG. 19 is a diagram illustrating the details of white gaps.

FIG. 18 is a diagram illustrating a target pixel located at the same coordinates in a plurality of dither matrices corresponding to a plurality of gradation values for use in the image processing flow of this embodiment, in which a gray portion (a hatched portion) is an area to which the exposure device 9 is caused to emit light. FIG. 18 shows a target pixel when the gradation value rises from M1 to M2 (M1<M2) from the left to the right.

At the gradation value M1, an area B, which is a minute exposure area, is disposed at first coordinates in a dither matrix. At a gradation value M2, the area B is disposed at the first coordinates, and an area A, which is a normal exposure area, is disposed at second coordinates. The area A and the area B are disposed side by side in the scanning direction (lateral direction), with a non-light-emitting area therebetween.

When the gradation value M2 rises one value to gradation value M2+1 (the density increases), the area A expands from the area A at the gradation value M2 to cause the toner dot image to grow, but the area B is erased to prevent interference with the area A, in which a non-light-emitting area is disposed. In other words, the area B is disposed at the first coordinates in a dither matrix at the gradation value M2 (a first dither matrix), and a non-light-emitting area is disposed at the first coordinates in a dither matrix at the gradation value M2+1 (a second dither matrix). The area A at the second coordinates in the dither matrix at the gradation value 2M+1 is larger than the area A at the second coordinates in the dither matrix at the gradation value M2.

As described above, according to this embodiment, designing dither matrices corresponding to individual gradation values suppresses an unintended increase in the size of a toner dot image at a given gradation value, as in the first embodiment. This prevents a toner dot image from growing sharply, for example, when the gradation value rises, thereby preventing tone jump in a halftone image. Furthermore, in this embodiment, disposing minute exposure areas for background exposure at regular intervals allows a more uniform potential of a non-toner-image forming area on the photosensitive drum 5 to be attained, thereby reducing degradation in image quality of this area.

According to some embodiments of the present invention, image defect when background exposure based on PWM is performed can be reduced.

While the present invention has been described with reference to exemplary embodiments, it is to be understood that the invention is not limited to the disclosed exemplary embodiments. The scope of the following Claims is to be accorded the broadest interpretation so as to encompass all such modifications and equivalent structures and functions.

This application claims the benefit of Japanese Patent Application No. 2013-227193 filed Oct. 31, 2013, which is hereby incorporated by reference herein in its entirety.

What is claimed is:

1. An image forming apparatus that forms an image by forming a latent image on a charged photosensitive member and adhering toner to the latent image, the apparatus comprising:

an exposure device that forms a latent image by illuminating the charged photosensitive member with a light generated based on a driving signal; and a signal generating unit that stores information on a plurality of dither matrices preset in correspondence with a density level of the toner to be adhered to the photosensitive member and converts input image data based on the dither matrices to generate the driving signal;

wherein the signal generating unit stores information on a first dither matrix corresponding to a first density level and a second dither matrix corresponding to a second density level higher than the first density level; and wherein the first dither matrix includes a minute exposure area, at predetermined coordinates, in which the exposure device is caused to emit light to attain a potential of the photosensitive member at which no toner adheres to the photosensitive member; and the second dither matrix includes a normal exposure area, at a position corresponding to the predetermined coordinates in the first dither matrix, in which the exposure device is caused to emit light to attain a potential of the photosensitive member at which toner adheres to the photosensitive member.

2. The image forming apparatus according to claim 1, wherein the plurality of dither matrices each include a plurality of pixels; and wherein the minute exposure area disposed at the predetermined coordinates in the first dither matrix is disposed in a first pixel of the first dither matrix, and the normal exposure area is disposed in a pixel of the second dither matrix, the pixel corresponding to the first pixel.

3. An image forming apparatus that forms an image by forming a latent image on a charged photosensitive member and adhering toner to the latent image, the apparatus comprising:

an exposure device that forms a latent image by illuminating the charged photosensitive member with a light generated based on a driving signal; and a signal generating unit that stores information on a plurality of dither matrices preset in correspondence with a density level of the toner to be adhered to the photosensitive member and converts input image data based on the dither matrices to generate the driving signal;

wherein the signal generating unit stores information on a first dither matrix corresponding to a first density level and a second dither matrix corresponding to a second density level higher than the first density level; and wherein the first dither matrix includes a minute exposure area, at first coordinates, in which the exposure device is caused to emit light to attain a potential of the photosensitive member at which no toner adheres to the photosensitive member; and a normal exposure area, at a second coordinates, in which the exposure device is caused to emit light to attain a potential of the photosensitive member at which toner adheres to the photosensitive member, the first coordinates and the second coordinates being disposed side by side in a scanning direction, and wherein a non-light-emitting area in which the exposure device is not caused to emit light is formed between the minute exposure area and the normal exposure area; and wherein the second dither matrix includes the non-light-emitting area at a position corresponding to the first coordinates and includes a normal light emitting area at a position corresponding to the second coordinates, the normal light emitting area being larger than the normal light emitting area at the second coordinates in the first dither matrix.

4. The image forming apparatus according to claim 3, wherein the plurality of dither matrices each include a plurality of pixels; and wherein the minute exposure area at the first coordinates in the first dither matrix and the normal exposure area at the second coordinates in the first dither matrix are each disposed in one of the pixels constituting the first dither matrix.

5. The image forming apparatus according to claim 3, wherein the plurality of dither matrices each include a plurality of pixels; and wherein the minute exposure area at the first coordinates in the first dither matrix is disposed in a first pixel of the first dither matrix, and the normal exposure area at the second coordinates is disposed in a second pixel next to the first pixel of the first dither matrix.

6. The image forming apparatus according to claim 3, wherein a width of the non-light-emitting area formed between the minute exposure area at the first coordinates in the first dither matrix and the normal exposure area at the second coordinates in the first dither matrix is shorter, in the scanning direction, than a width of a pixel of the first dither matrix.

7. The image forming apparatus according to claim 6, wherein, a width of the non-light-emitting area formed between the minute exposure area at the first coordinates in the first dither matrix and the normal exposure area at the second coordinates in the first dither matrix is longer, in the scanning direction, than 5% of a width of a pixel of the first dither matrix.

8. The image forming apparatus according to claim 1, wherein a time interval during which the exposure device emits light according to the driving signal corresponding to the minute exposure area is shorter than a time interval during which the exposure device emits light according to the driving signal corresponding to the normal exposure area.

9. The image forming apparatus according to claim 3, wherein a time interval during which the exposure device emits light according to the driving signal corresponding to the minute exposure area is shorter than a time interval during which the exposure device emits light according to the driving signal corresponding to the normal exposure area.

10. An image forming apparatus that forms an image by forming a latent image on a charged photosensitive member and adhering toner to the latent image, the apparatus comprising:

an exposure device that forms a latent image by illuminating the charged photosensitive member with a light generated based on a driving signal; and a signal generating unit that stores information on a plurality of dither matrices preset in correspondence with a density level of the toner to be adhered to the photosensitive member and converts input image data based on the dither matrices to generate the driving signal;

wherein the signal generating unit stores information on a first dither matrix corresponding to a first density level and a second dither matrix corresponding to a second density level higher than the first density level; and wherein the first dither matrix includes a first area at predetermined coordinates in an area in which no image is formed and in which the exposure device is caused to emit light; and the second dither matrix includes a second area, at a position corresponding to the predetermined coordinates in the first dither matrix, in an area in which an image is formed and in which the exposure device is caused to emit light.

11. The image forming apparatus according to claim 10, wherein the plurality of dither matrices each include a plurality of pixels; and wherein the first area disposed at the predetermined coordinates in the first dither matrix is disposed in a first pixel of the first dither matrix, and the second area is disposed in a pixel of the second dither matrix, the pixel corresponding to the first pixel.

12. An image forming apparatus that forms an image by forming a latent image on a charged photosensitive member and adhering toner to the latent image, the apparatus comprising:

an exposure device that forms a latent image by illuminating the charged photosensitive member with a light generated based on a driving signal; and a signal generating unit that stores information on a plurality of dither matrices preset in correspondence with a density level of the toner to be adhered to the photosensitive member and converts input image data based on the dither matrices to generate the driving signal;

wherein the signal generating unit stores information on a first dither matrix corresponding to a first density level and a second dither matrix corresponding to a second density level higher than the first density level; and wherein the first dither matrix includes a first area at first coordinates in an area in which no image is formed and in which the exposure device is caused to emit light; and a second area at second coordinates in an area in which an image is formed and in which the exposure device is caused to emit light, the first coordinates and the second coordinates being disposed side by side in a scanning direction, and wherein a non-light-emitting area in which the exposure device is not caused to emit light is formed between the first area and the second area; and wherein the second dither matrix includes the non-light-emitting area at a position corresponding to the first coordinates and includes an another second area at a position corresponding to the second coordinates, the another second area being larger than the second area at the second coordinates in the first dither matrix.

13. The image forming apparatus according to claim 12, wherein the plurality of dither matrices each include a plurality of pixels; and wherein the first area at the first coordinates in the first dither matrix and the second area at the second coordinates in the first dither matrix are each disposed in one of the pixels constituting the first dither matrix.

14. The image forming apparatus according to claim 12, wherein the plurality of dither matrices each include a plurality of pixels; and wherein the first area at the first coordinates in the first dither matrix is disposed in a first pixel of the first dither matrix, and the second area at the second coordinates is disposed in a second pixel next to the first pixel of the first dither matrix.

15. The image forming apparatus according to claim 12, wherein a width of the non-light-emitting area formed between the first area at the first coordinates in the first dither matrix and the second area at the second coordinates in the first dither matrix is shorter, in the scanning direction, than a width of a pixel of the first dither matrix.

16. The image forming apparatus according to claim 15, wherein, a width of the non-light-emitting area formed between the first area at the first coordinates in the first dither matrix and the second area at the second coordinates in the first dither matrix is longer, in the scanning direction, than 5% of a width of a pixel of the first dither matrix.

17. The image forming apparatus according to claim 10, wherein a time interval during which the exposure device emits light according to the driving signal corresponding to the first area is shorter than a time interval during which the exposure device emits light according to the driving signal corresponding to the second area.

18. The image forming apparatus according to claim 12, wherein a time interval during which the exposure device emits light according to the driving signal corresponding to the first area is shorter than a time interval during which the exposure device emits light according to the driving signal corresponding to the second area.

* * * * *